US009246645B2

(12) United States Patent
Kim et al.

(10) Patent No.: US 9,246,645 B2
(45) Date of Patent: Jan. 26, 2016

(54) APPARATUS AND METHOD OF TRANSMITTING RECEPTION ACKNOWLEDGEMENT IN WIRELESS COMMUNICATION SYSTEM

(75) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG ELECTRONICS INC., Seoul (JP)

( * ) Notice: Subject to any disclaimer, the term of this patent is extended or adjusted under 35 U.S.C. 154(b) by 389 days.

(21) Appl. No.: 13/516,068

(22) PCT Filed: Dec. 13, 2010

(86) PCT No.: PCT/KR2010/008882
§ 371 (c)(1),
(2), (4) Date: Jun. 14, 2012

(87) PCT Pub. No.: WO2011/074839
PCT Pub. Date: Jun. 23, 2011

(65) Prior Publication Data
US 2012/0300722 A1 Nov. 29, 2012

Related U.S. Application Data

(60) Provisional application No. 61/287,163, filed on Dec. 16, 2009.

(30) Foreign Application Priority Data

Nov. 19, 2010 (KR) ........................ 10-2010-0115389

(51) Int. Cl.
*H04L 5/00* (2006.01)
*H04L 1/18* (2006.01)

(52) U.S. Cl.
CPC ............ *H04L 5/0007* (2013.01); *H04L 1/1861* (2013.01); *H04L 5/0053* (2013.01); *H04L 5/0055* (2013.01); *H04L 5/0094* (2013.01)

(58) Field of Classification Search
CPC ..... H04L 1/1861; H04L 5/0094; H04L 5/0053; H04L 5/0007
USPC .................... 370/328, 329, 330; 455/450, 509
See application file for complete search history.

(56) References Cited

U.S. PATENT DOCUMENTS

| 2009/0207797 | A1* | 8/2009 | Shen et al. ........... 370/329 |
| 2010/0172290 | A1* | 7/2010 | Nam et al. ........... 370/328 |
| 2010/0172308 | A1* | 7/2010 | Nam et al. ........... 370/329 |
| 2011/0044259 | A1* | 2/2011 | Nimbalker et al. ........... 370/329 |

OTHER PUBLICATIONS

Nokia Siemens Networks et al., "UL control signalling for carrier aggregation," 3GPP TSG-RAN WG1 Meeting #57bis, R1-092572, Jun. 29-Jul. 3, 2009.

(Continued)

*Primary Examiner* — Pao Sinkantarakorn
*Assistant Examiner* — Richard Chang
(74) *Attorney, Agent, or Firm* — Birch, Stewart, Kolasch & Birch, LLP

(57) ABSTRACT

A method and apparatus for transmitting reception acknowledgment for hybrid automatic repeat request (HARQ) in a wireless communication system are provided. A user equipment receives a plurality of downlink resource allocations on a plurality of downlink control channels by using a plurality of downlink carriers, and receives a plurality of downlink transfer blocks on a plurality of downlink shared channels indicated by the plurality of downlink resource allocations. The user equipment determines a plurality of acknowledgment (ACK)/negative acknowledgment (NACK) resource indices based on a plurality of resource indices obtained from downlink resources which use the plurality of downlink control channels. The user equipment transmits ACK/NACK for the plurality of downlink transfer blocks by using ACK/NACK resources indicated by the plurality of ACK/NACK resource indices.

9 Claims, 19 Drawing Sheets

(56) References Cited

OTHER PUBLICATIONS

Panasonic, "UL ACK/NACK transmission on Pucch for carrier aggregation", 3GPP TSG-RAN WG1 Meeting #57bis, R1-092535, Jun. 29-Jul. 3, 2009.

Qualcomm Europe, "UL HARQ Feedback for Multicarrier Operation", 3GPP TSG-RAN WG1 #57bis, R1-092709, Jun. 29-Jul. 3, 2009.

Samsung, "Phich Mapping in Asymmetric Carrier Aggregation", 3GPP TSG-RAN WG1 Meeting #58bis, R1-094080, Oct. 12-16, 2009.

* cited by examiner

APPARATUS AND METHOD OF TRANSMITTING RECEPTION ACKNOWLEDGEMENT IN WIRELESS COMMUNICATION SYSTEM

CROSS REFERENCE TO RELATED APPLICATIONS

This application is the National Phase of PCT/KR2010/008882 filed on Dec. 13, 2010, which claims priority under 35 U.S.C. 119(e) to U.S. Provisional Application No. 61/287,163 filed on Dec. 16, 2009 and under 35 U.S.C 119(a) to Patent Application No. 10-2010-0115389 filed in Korea, on Nov. 19, 2010, all of which are hereby expressly incorporated by reference into the present application.

TECHNICAL FIELD

The present invention relates to wireless communications, and more particularly, to a method and apparatus for transmitting reception acknowledgment for hybrid automatic repeat request (HARQ) in a wireless communication system.

BACKGROUND ART

Long term evolution (LTE) based on 3rd generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE may be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is distinguished by using different codes, frequencies, times, or combinations thereof while using the same time-frequency resources. Code division multiplexing (CDM) uses different codes. Frequency division multiplexing (FDM) uses different frequencies. That is, each of user equipments transmits its PUCCH by using different codes and/or frequencies by using the same time resource.

Meanwhile, in a single-carrier system, only one carrier is considered even if a bandwidth between an uplink and a downlink is configured differently from each other. The carrier is defined with a center frequency and a bandwidth. A multiple-carrier system uses a plurality of component carriers (CCs) having a smaller bandwidth than a full bandwidth.

The multiple-carrier system may support backward compatibility with respect to legacy systems, and significantly increases a data rate by using multiple carriers.

The 3GPP LTE system is a single-carrier system that supports only one bandwidth (i.e., one carrier) among {1.4, 3, 5, 10, 15, 20} MHz. However, multiple carriers are used in an LTE-advanced (LTE-A) system which is an evolution of the 3GPP LTE.

A control channel and a data channel are designed in the single-carrier system on the basis of a single carrier. It may be ineffective when a channel structure of the single-carrier system is also used without alternation in the multiple-carrier system.

DISCLOSURE OF INVENTION

Technical Problem

The present invention provides a method and apparatus for reception acknowledgment for hybrid automatic repeat request (HARQ) in a multiple-carrier system.

Solution to Problem

According to an aspect of the present invention, a method of transmitting reception acknowledgment for hybrid automatic repeat request (HARQ) of a user equipment in a wireless communication system is provided. The method comprises receiving a plurality of downlink resource allocations on a plurality of downlink control channels by using a plurality of downlink carriers, receiving a plurality of downlink transfer blocks on a plurality of downlink shared channels indicated by the plurality of downlink resource allocations, determining a plurality of acknowledgment (ACK)/negative acknowledgment (NACK) resource indices based on a plurality of resource indices obtained from downlink resources which use the plurality of downlink control channels and transmitting ACK/NACK for the plurality of downlink transfer blocks by using ACK/NACK resources indicated by the plurality of ACK/NACK resource indices.

The downlink-resource may be control channel elements (CCEs), and each of the plurality of resource indices may be a CCE index of a first CCE used by each of the plurality of downlink control channels.

Different ACK/NACK resource indices may be determined respectively from the plurality of resource indices.

Same ACK/NACK resource index may be determined from at least two of the plurality of resource indices.

The determining of the ACK/NACK resource indices may comprise determining each of the plurality of ACK/NACK resource indices respectively mapped to the plurality of resource indices on the basis of an offset.

According to another aspect of the present invention, a user equipment for transmitting reception acknowledgment for hybrid automatic repeat request (HARQ) of the user equipment in a wireless communication system is provided. The user equipment comprises a radio frequency (RF) unit transmitting and receiving a radio signal and a processor coupled to the RF unit, wherein the processor is configured for receiving a plurality of downlink resource allocations on a plurality of downlink control channels by using a plurality of downlink carriers, receiving a plurality of downlink transfer blocks on a plurality of downlink shared channels indicated by the plurality of downlink resource allocations, determining a plurality of acknowledgment (ACK)/negative acknowledgment (NACK) resource indices based on a plurality of resource indices obtained from downlink resources which use the plurality of downlink control channels and transmitting ACK/NACK for the plurality of downlink transfer blocks by using ACK/NACK resources indicated by the plurality of ACK/NACK resource indices.

Advantageous Effects of Invention

The present invention provides a method of determining a resource for transmitting acknowledgment (ACK)/negative acknowledgment (NACK) when using a plurality of downlink component carriers.

MODE FOR THE INVENTION

Figure 1:
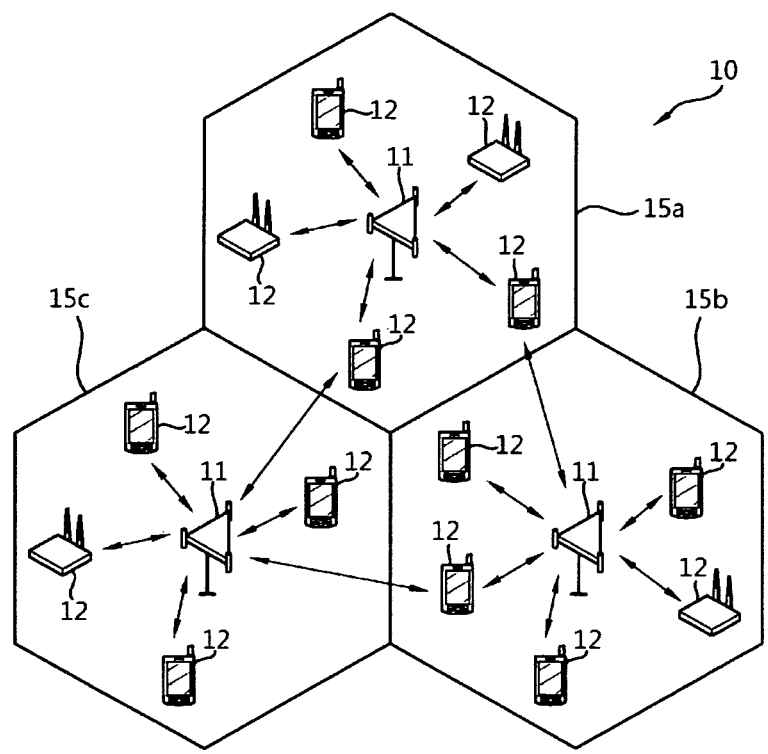
FIG. 1 is a diagram showing a wireless communication system.

FIG. 1 is a diagram showing a wireless communication system. A wireless communication system 10 includes one or more base stations (BSs) 11. Each of the BSs 11 provides communication services to a specific geographical area (in general referred to as a cell) 15a, 15b, or 15c. Each of the cells may be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink (DL) implies communication from the BS to the UE, and uplink (UL) implies communication from the UE to the BS. In the DL, a transmitter may be a part of the BS, and a receiver may be a part of the MS. In the UL, the transmitter may be a part of the UE, and the receiver may be a part of the BS.

Figure 2:
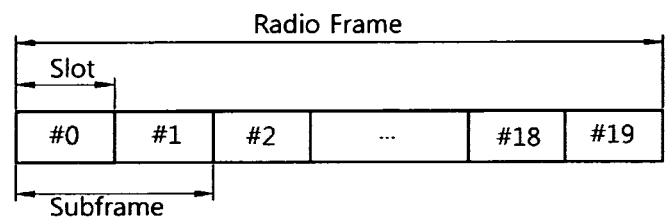
FIG. 2 is a diagram showing a structure of a radio frame in 3rd generation partnership project (3GPP) long term evolution (LTE).

FIG. 2 is a diagram showing a structure of a radio frame in 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a DL, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

The structure of the radio frame is for exemplary purposes only, and thus the number of subframes included in the radio frame or the number of slots included in the subframe, and the number of OFDM symbols included in the slot may change variously.

Figure 3:
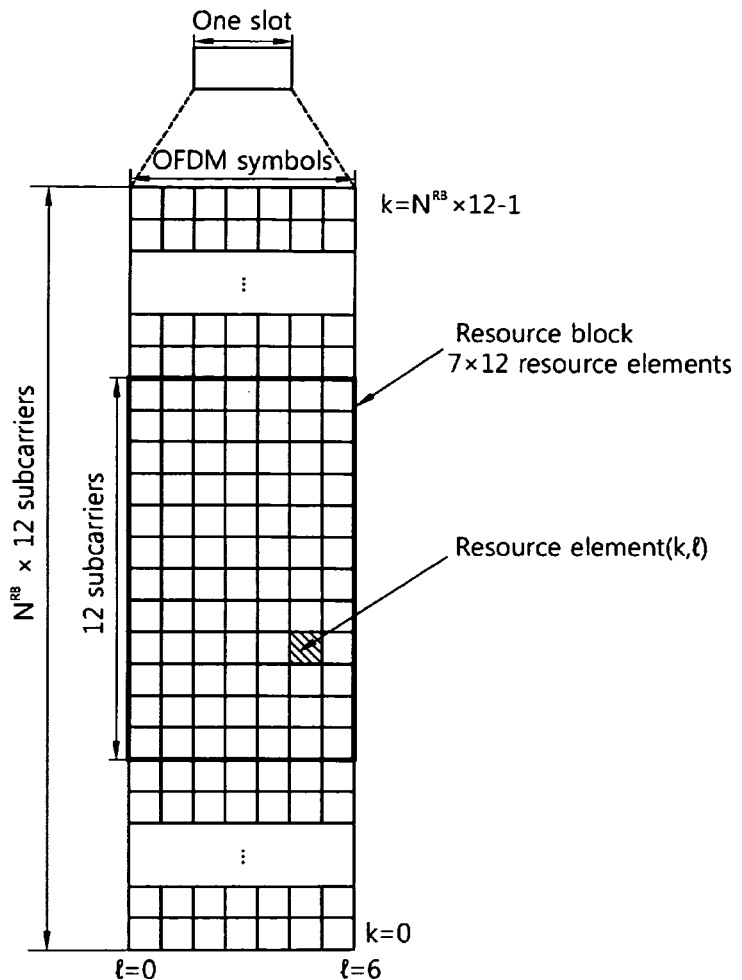
FIG. 3 shows an example of a resource grid for one slot.

FIG. 3 shows an example of a resource grid for one slot.

A slot in a subframe includes a plurality of OFDM symbols in time domain and a plurality of resource blocks (RBs) in frequency domain.

It is described herein that one DL slot includes 7 OFDMA symbols and one resource block includes 12 subcarriers for exemplary purposes only, and the present invention is not limited thereto.

Each element on the resource grid is referred to as a resource element, and one resource block includes 12 7 resource elements. The number $N^{DL}$ of resource blocks included in the DL slot depends on a DL transmission bandwidth determined in a cell.

A RB is a resource allocation unit, and includes a plurality of subcarriers in the slot. For example, if one slot includes 7

OFDM symbols in time domain and the RB includes 12 subcarriers in frequency domain, one RB may include 84 resource elements (REs).

The number $N^{RB}$ of RBs depends on system bandwidth or bandwidth of a component carrier.

Figure 4:
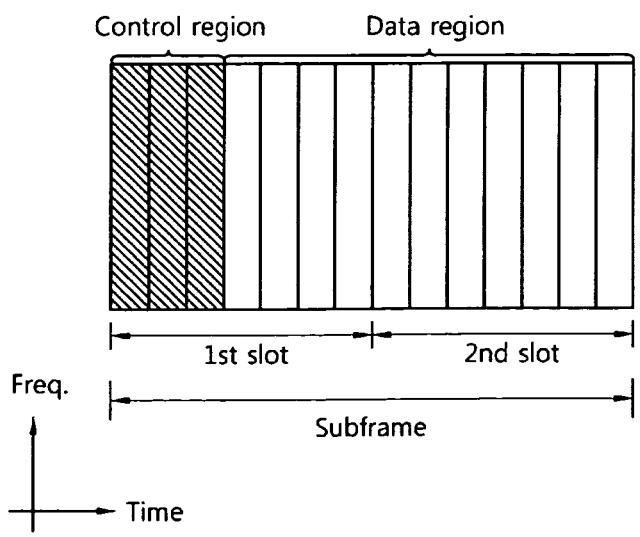
FIG. 4 is a diagram showing a structure of a downlink (DL) subframe in 3GPP LTE.

FIG. 4 is a diagram showing a structure of a DL subframe in 3GPP LTE:

A DL subframe is divided into a control region and a data region in time domain. The control region includes up to three preceding OFDM symbols of a 1st slot in the subframe. The number of OFDM symbols included in the control region may vary. A PDCCH is allocated to the control region, and a PDSCH is allocated to the data region.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., a physical downlink control channel (PDCCH), PCFICH (Physical Control Format Indicator Channel), PHICH (Physical Hybrid-ARQ Indicator Channel) and a physical uplink control channel (PUCCH). Further, there is a downlink control channel, i.e., a physical control format indicator channel (PCFICH) and a physical hybrid-ARQ indicator channel (PHICH).

The PCFICH transmitted in the first OFDM symbol of the subframe carries a control format indicator (CFI) indicating the number of OFDM symbols (i.e., a size of the control region) used in transmission of control channels in the subframe. A UE first receives the CFI over the PCFICH, and thereafter monitors the PDCCH.

The PHICH carries a positive-acknowledgement (ACK)/negative-acknowledgement (NACK) signal for hybrid automatic repeat request (HARQ). The ACK/NACK signal for a UL transport block on the PUSCH transmitted by the UE is transmitted on the PHICH.

Control information transmitted through the PDCCH is referred to as downlink control information (DCI). The DCI may include a PDSCH resource allocation (referred to as a DL grant), a PUSCH resource allocation (referred to as a UL grant), a set of transmit power control commands for individual UEs in any UE group, and/or activation of a voice over Internet protocol (VoIP).

The DCI on the PDCCH is received by using blind decoding. A plurality of candidate PDCCHs may be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

Figure 5:
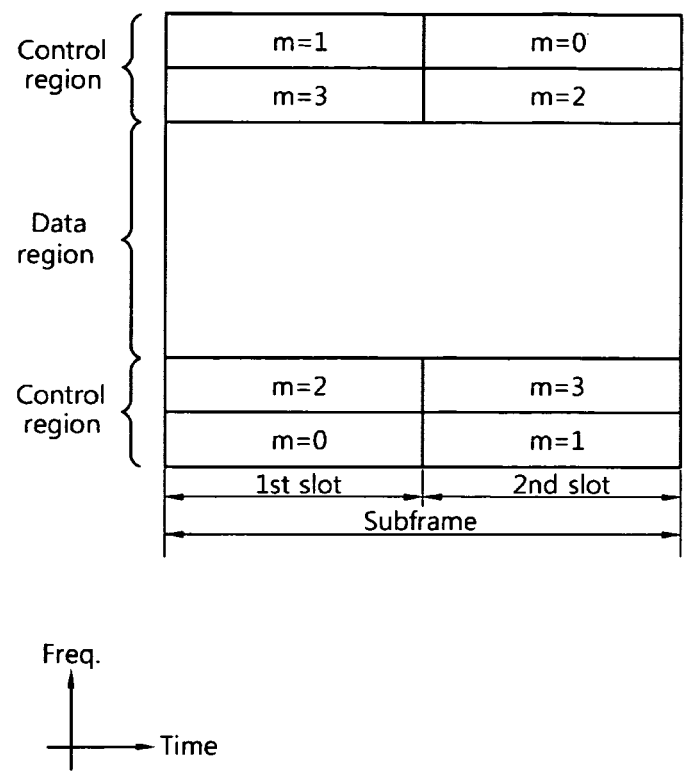
FIG. 5 is a diagram showing an example of an uplink (UL) subframe in 3GPP LTE.

FIG. 5 is a diagram showing an example of a UL subframe in 3GPP LTE.

The UL subframe may be divided into a control region to which a physical uplink control channel (PUCCH) carrying UL control information is allocated and a data region to which a physical uplink shared channel (PUSCH) carrying UL data is allocated.

A PUCCH for a UE is allocated in a pair of resource blocks in a subframe. Resources blocks belonging to the resource block-pair occupy different subcarriers in a first slot and a second slot. In FIG. 5, m is a position index indicating a logical frequency region position of the resource block pair, allocated to PUCCHs within the UL subframe. FIG. 5 shows that resource blocks having the same m value occupy different subcarriers in the two slots.

In accordance with 3GPP TS 36.211 V8.5.0 (2008-12), a PUCCH supports a multiple formats. PUCCHs having different numbers of bits per subframe may be used in accordance with a modulation scheme dependent on a PUCCH format.

The table 1 shows an example of modulation schemes and the number of bits per subframe according to PUCCH formats.

TABLE 1

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used to transmit an SR (Scheduling Request), the PUCCH formats 1a/1b are used to transmit an ACK/NACK signal for an HARQ, the PUCCH format 2 is used to transmit a CQI, and each of the PUCCH formats 2a/2b is used to simultaneously transmit a CQI and an ACK/NACK signal. When only the ACK/NACK signal is transmitted in a subframe, the PUCCH formats 1a/1b are used, but when only the SR is transmitted in a subframe, the PUCCH format 1 is used. When the SR and the ACK/NACK signal are simultaneously transmitted, the PUCCH format 1 is used. The ACK/NACK signal modulated in resources to which the SR has been allocated is transmitted.

Each of all the PUCCH formats uses the cyclic shift (CS) of a sequence in each OFDM symbol. The cyclic-shifted sequence is generated by cyclically shifting a base sequence by a specific CS amount. The specific CS amount is indicated by a CS index.

An example in which the base sequence $r_u(n)$ is defined is shown as:

MathFigure 1

$$r_u(n) = e^{jb(n)\pi/4} \qquad \text{[Math.1]}$$

where u indicates a root index, n indicates an element index where $0 \le n \le N-1$, and N indicates the length of the base sequence. b(n) is defined in section 5.5 of 3GPP TS 36.211 V8.7.0.

The length of the base sequence is equal to the number of elements included in the base sequence. u may be determined based on a cell ID (identifier) or a slot number within a radio frame. Assuming that the base sequence is mapped to one resource block in the frequency domain, the length of the base sequence N is 12 because one resource block includes 12 subcarriers. A different base sequence may be defined on the basis of a different root index.

A cyclic-shifted sequence $r(n, I_{cs})$ may be generated by cyclically shifting the base sequence r(n) as shown:

MathFIGURE 2

$$r(n, I_{cs}) = r(n) \cdot \exp\left(\frac{j2\pi I_{cs}n}{N}\right), 0 \leq I_{cs} \leq N-1 \quad \text{[Math. 2]}$$

where $I_{cs}$ is a CS index indicating the CS amount ($0 \leq I_{cs} \leq N-1$).

Hereinafter, available CS indices of the base sequence refer to CS indices that may be derived from the base sequence on the basis of a CS interval. For example, assuming that the length of the base sequence is 12 and the CS interval is 1, a total number of available CS indices of the base sequence is 12. Assuming that the length of the base sequence is 12 and the CS interval is 2, the number of available CS indices of the base sequence is 6.

A method of transmitting the HARQ ACK/NACK signal in the PUCCH formats 1a/1b is described below.

Figure 6:
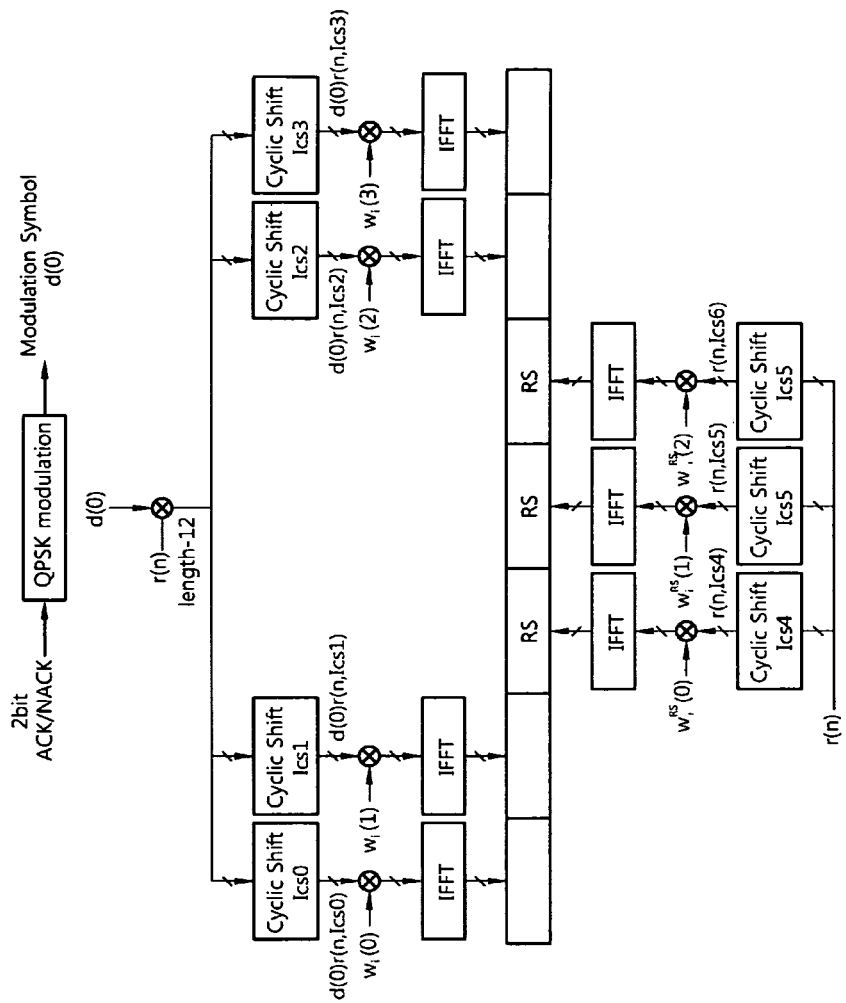
FIG. 6 is a diagram showing a physical uplink control channel (PUCCH) format 1b in a normal cyclic prefix (CP) in 3GPP LTE.

FIG. 6 is a diagram showing a PUCCH format 1b in a normal CP in 3GPP LTE. On slot includes 7 OFDM symbols. 7 OFDM symbols are divided into 3 reference signal (RS) OFDM symbols and 4 data OFDM symbols for a ACK/NACK signal.

For PUCCH format 1b, a modulation symbol d(0) is generated by modulating a 2-bit ACK/NACK signal through QPSK (Quadrature Phase Shift Keying).

The CS index $I_{cs}$ may vary depending on a slot number ($n_s$) within a radio frame or a symbol index $\ell$ within a slot or both.

Since there are 4 data OFDM symbols used for transmission of the ACK/NACK signal in the normal CP, it is assumed that CS indexes corresponding to 4 data OFDM symbols are $I_{cs0}, I_{cs1}, I_{cs2}$ and $I_{cs3}$.

The modulation symbol d(0) is spread with a cyclic-shifted sequence $r(n, I_{cs})$. Assuming one-dimensional spread sequence corresponding to an (i+1)th OFDM symbol in a subframe is m(i), for i=0, 1, 2, 3, it may be expressed as:

{m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}.

To increase UE capacity, the one-dimensional spread sequence may be spread using an orthogonal sequence.

An orthogonal sequence $w_i(k)$, where i is a sequence index and $0 \leq k \leq K-1$, having a spreading factor K=4 may use the following sequence.

TABLE 2

| Index(i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The orthogonal sequence $w_i(k)$, where i is a sequence index and $0 \leq k \leq K-1$, having a spreading factor K=3 may use the following sequence.

TABLE 3

| Index(i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor may be used for each slot.

Accordingly, assuming that a certain orthogonal sequence index i is given, 2-dimensional spread sequences s(0), s(1), s(2), s(3) may be expressed as follows:

{{s(0), s(1), s(2), s(3)}={$w_i(0)$m(0),$w_i(1)$m(1),$w_i(2)$m(2), $w_i(3)$m(3)}.

The two-dimensional spread sequences {s(0), s(1), s(2), s(4)} are subject to IFFT and then transmitted through corresponding OFDM symbols. Accordingly, the ACK/NACK signal is transmitted on the PUCCH.

A reference signal for the PUCCH format 1b is also transmitted by cyclically shifting the base sequence r(n) and then by spreading it by the use of an orthogonal sequence. When cyclic-shift indices corresponding to three RS OFDM symbols are denoted by $I_{cs4}, I_{cs5}, I_{cs6}$, three cyclic-shifted sequences r(n,$I_{cs4}$),r(n,$I_{cs5}$), and r(n,$I_{cs6}$) may be obtained. The three cyclic-shifted sequences are spread by the use of an orthogonal sequence $w^{RS}_i(k)$ having a spreading factor K=3.

An orthogonal sequence index i, a cyclic shift index $I^{cs}$, and a resource block index m are parameters required to configure the PUCCH and are also resources used to identify the PUCCH (or UE). If the number of available cyclic shifts is 12 and the number of available orthogonal sequence indices is 3, PUCCHs for 36 UEs in total may be multiplexed to one resource block.

In the 3GPP LTE, a resource index $n^{(1)}_{PUCCH}$ is defined in order for the UE to obtain the three parameters for configuring the PUCCH. The resource index $n^{(1)}_{PUCCH}$ is defined to $n_{CCE}+N^{(1)}_{PUUCH}$, is an index of a first CCE used for transmission of a corresponding DCI (i.e., DL resource allocation used to receive DL data corresponding to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) may be expressed with at least any one of an orthogonal sequence index i, a cyclic shift index $I_{cs}$, a resource block index m, and an index for obtaining the three indices. The ACK/NACK resource may include at least one of an orthogonal sequence, a cyclic shift, a resource block, and a combination thereof.

Consequently, a resource used for PUCCH transmission may be implicitly determined depending on a resource of a corresponding PDCCH. This is because the BS does not additionally report a resource used by the UE in PUCCH transmission for the ACK/NACK signal, and reports it indirectly by using a resource used for the PDCCH for scheduling of a DL transfer block.

Figure 7:
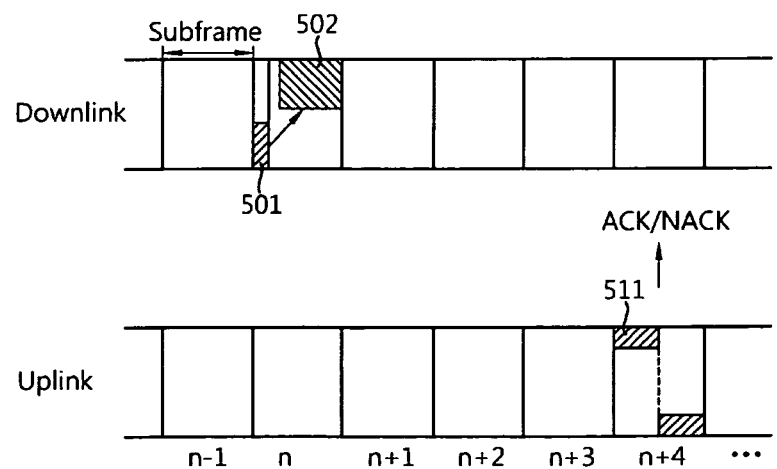
FIG. 7 shows an example of performing hybrid automatic repeat request (HARQ).

FIG. 7 shows an example of performing HARQ.

By monitoring a PDCCH, a UE receives a DL resource allocation on a PDCCH 501 in an $n^{th}$ DL subframe. The UE receives a DL transport block through a PDSCH 502 indicated by the DL resource allocation.

The UE transmits an ACK/NACK signal for the DL transport block on a PUCCH 511 in an $(n+4)^{th}$ UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until up to a maximum number of retransmission attempts.

To configure the PUCCH 511, the UE uses a resource allocation of the PDCCH 501. That is, a lowest CCE index (or an index of a first CCE) used for transmission of the PDCCH 501 is $n_{CCE}$, and a resource index is determined as $n^{(1)}_{PUUCH}=n_{CCE}+N^{(1)}_{PUUCH}$.

Now, ACK/NACK transmission in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, the UL subframes for transmitting an ACK/NACK signal are insufficient, and thus transmission of a plurality of ACK/NACK signals for a plurality of DL transport blocks in one UL subframe is supported. According to the section 10. of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted and otherwise, NACK is transmitted.

Second, the channel selection is also called ACK/NACK multiplexing. The UE transmits the ACK/NACK by selecting a plurality of reserved PUCCH resources.

Assume that M DL subframes are linked to a UL subframe n.

If M=3, an example of the channel selection is as shown in the following table.

TABLE 4

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among M DL subframes. It means that discontinuous transmission (DTX) cannot receive the DL transport block on the PDSCH in a corresponding DL subframe. According to Table 4 above, there are three PUCCH resources (i.e., $n^{(1)}_{PUCCH,0}$, $n^{(1)}_{PUCCH,1}$, and $n^{(1)}_{PUCCH,2}$), and b(0) and b(1) are two bits transmitted by using the selected PUCCHs.

For example, if the UE successfully receives all of the 3 DL transport blocks in the 3 DL subframes, the UE transmits a bit (1,1) on the PUCCH by using $n^{(1)}_{PUCCH,2}$. If the UE fails in the decoding of the DL transport block in a first DL subframe (i=0) and successfully decodes the remaining DL transport blocks, the UE transmits a bit (1, 0) on the PUCCH by using $n^{(1)}_{PUCCH,2}$.

In the channel selection, if there is at least one ACK, then NACK and DTX are coupled. This is because it is impossible to represent all ACK/NACK states with a combination of a reserved PUCCH resource and a QPSK symbol. However, if there is no ACK, then DTX and NACK are decoupled.

The existing PUCCH format 1b may transmit only 2-bit ACK/NACK. However, the cell selection links allocated PUCCH resources and actual ACK/NACK signals to represent more ACK/NACK states.

Figure 8:
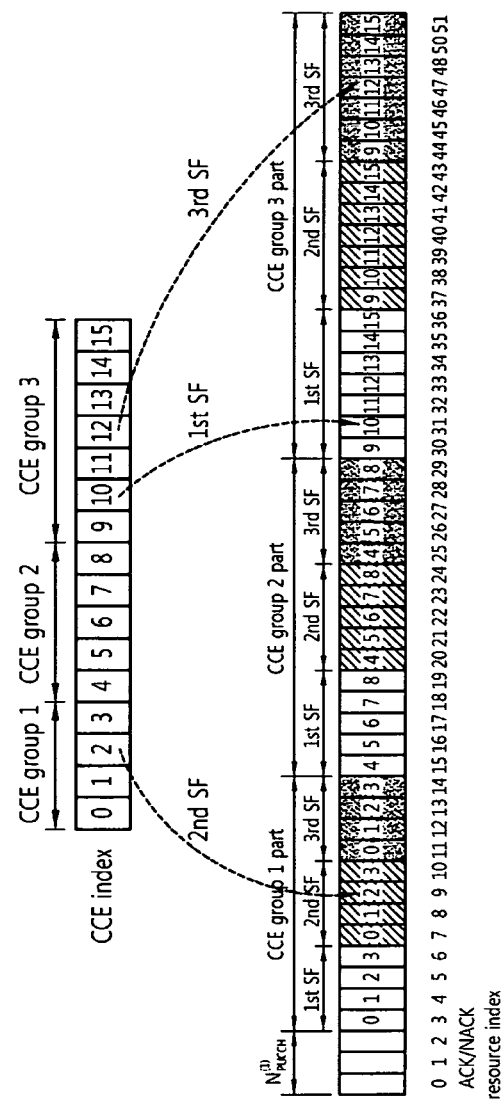
FIG. 8 shows an example of mapping between an acknowledgment (ACK)/negative acknowledgment (NACK) resource and a control channel element (CCE) in 3GPP LTE.

FIG. 8 shows an example of mapping between an ACK/NACK resource and a CCE in 3GPP LTE. In the TDD, bundling ACK/NACK may be transmitted for a plurality of DL subframes. Herein, a link relation of the ACK/NACK resource with respect to M DL subframes (where M=3) will be described in particular.

All CCEs are grouped into several CCE groups. It is assumed that the total number of CCEs is 16, and the CCEs are indexed from 0 to 15. It is also assumed that, if one OFDM symbols is available for a PUCCH, available CCE indices are 0 to 3, if two OFDM symbols are available for a PDCCH, available CCE indices are 0 to 8, and if three OFDM symbols are available for the PDCCH, available CCE indices are 0 to 15.

A CCE group 1 includes a CCE 0 to a CCE 3. A CCE group 2 includes a CCE 4 to a CCE 8. A CCE group 3 includes a CCE 9 to a CCE 15.

After grouping the CCEs, the respective groups are mapped to the ACK/NACK resources by the number of subframes (SF) in a duplicate manner. Starting from the CCE group 1, four CCEs for a first subframe are mapped to the ACK/NACK resources and thereafter four CCEs for a second subframe and a third subframe are sequentially mapped to the ACK/NACK resources.

A CCE group 1 part represents mapping of CCE indices in the CCE group 1 to the ACK/NACK resources by repeating the indices 3 times for 3 subframes. A CCE group 2 part represents mapping of CCE indices in the CCE group 2 to the ACK/NACK resources by repeating the indices 3 times for 3 subframes. A CCE group 3 part represents mapping of CCE indices in the CCE group 3 to the ACK/NACK resources by repeating the indices 3 times for 3 subframes.

More specifically, an indication relation between a CCE index and an ACK/NACK resource index will be described.

If a first subframe uses 3 OFDM symbols in a control region and an index of a first CCE used for PDCCH transmission is 10, then it indicates an ACK/NACK resource having an ACK/NACK resource index belonging to the first subframe part in the CCE group 3 part.

If a second subframe uses one OFDM symbol in the control region and the index of the first CCE used for PDCCH transmission is 2, then a corresponding ACK/NACK resource index is 9.

If a third subframe uses 3 OFDM symbols in the control region and the index of the first CCE used for PDCCH transmission is 12, a corresponding ACK/NACK resource index is 47.

By mapping the CCE index to the ACK/NACK resource in such a manner, if the number of OFDM symbols available for PDCCH transmission at a specific time is less than 3, some of resources secured for ACK/NACK transmission may be utilized for UL data transmission, thereby being able to increase resource utilization.

Now, a multiple-carrier system will be described.

The 3GPP LTE system supports a case where a DL bandwidth and a UL bandwidth are determined differently under the premise that one component carrier (CC) is used. The 3GPP LTE system supports up to 20 MHz. Although the UL bandwidth and the DL bandwidth may be different from each other, the 3GPP LTE system supports only one carrier for each of UL and DL cases.

A spectrum aggregation (or a bandwidth aggregation or a carrier aggregation) supports a plurality of carriers. For example, if 5 carriers are allocated in a granularity of a carrier unit having a bandwidth of 20 MHz, a bandwidth of up to 100 MHz may be supported.

Figure 9:
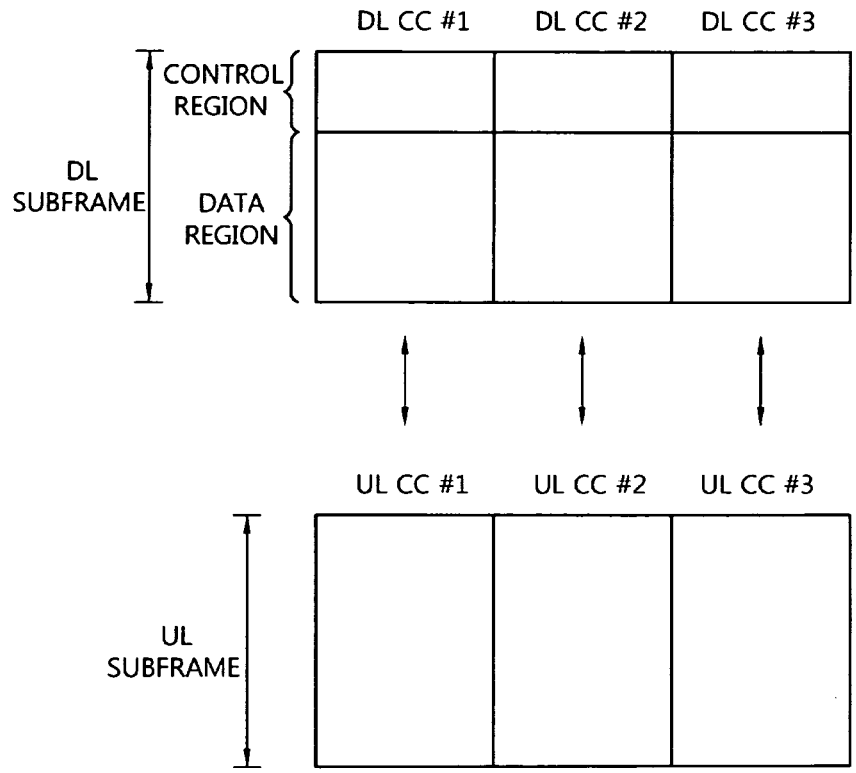
FIG. 9 shows an example of multiple carriers.

FIG. 9 shows an example of multiple carriers.

Although there are 3 DL CCs and 3 UL CCs, the number of DL CCs and the number of UL CCs are not limited to 3. A PDCCH and a PDSCH are independently transmitted in each DL CC. A PUCCH and a PUSCH are independently transmitted in each UL CC.

A UE may monitor the PDCCH by using a plurality of DL CCs, and may receive a DL transport block simultaneously by using a plurality of DL CCs. The UE may transmit a plurality of UL transport blocks simultaneously by using a plurality of UL CCs.

Carrier scheduling may be performed by using two methods in the multiple-carrier system.

In the first method, a PDCCH-PDSCH pair is transmitted on one carrier. This is referred to as self-scheduling. In addition, it implies that a UL CC on which the PUSCH is transmitted is a carrier linked to a DL CC on which the PDCCH is transmitted. That is, the PDCCH allocates a PDSCH resource on the same carrier, or allocates a PUSCH resource on a linked UL CC.

In the second method, a DL CC on which the PDSCH is transmitted or a UL CC on which the PUSCH is transmitted are determined irrespective of the DL CC on which the PDCCH is transmitted. That is, the PDCCH and the PDSCH are transmitted on different DL CCs, or the PUSCH is transmitted on a UL CC unlinked to the DL CC on which the PDCCH is transmitted. This is called cross-carrier scheduling. A carrier on which the PDCCH is transmitted is called a PDCCH carrier, a monitoring carrier, or a scheduling carrier. A carrier on which the PDSCH/PUSCH is transmitted is called a PDSCH/PUSCH carrier or a scheduled carrier.

Figure 10:
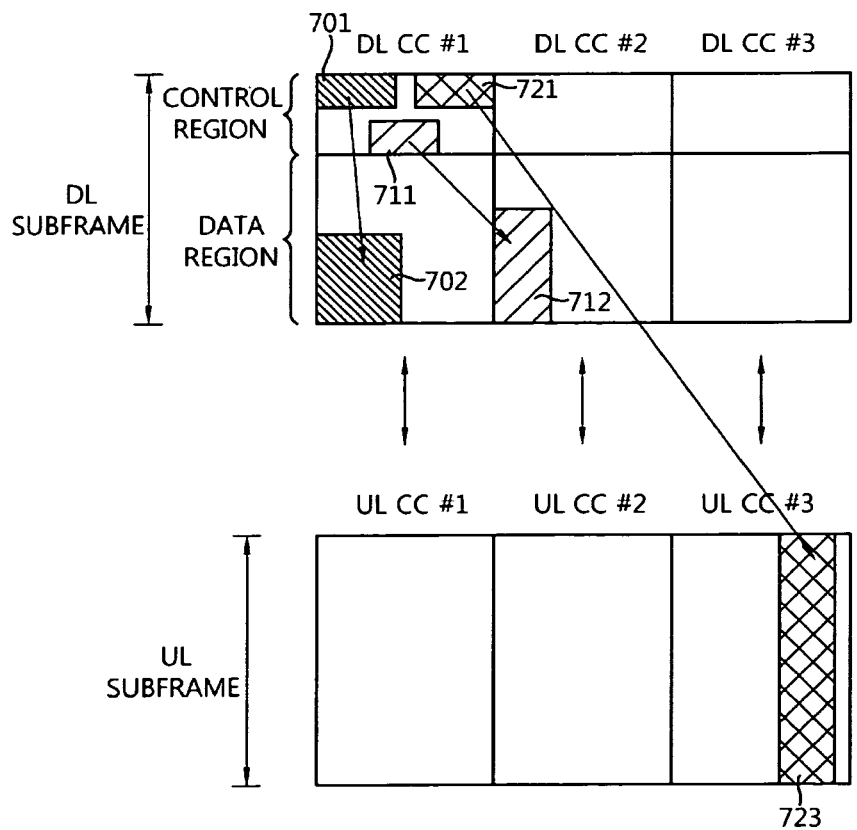
FIG. 10 shows an example of cross-carrier scheduling.

FIG. 10 shows an example of cross-carrier scheduling. It is assumed that a DL CC #1 is linked to a UL CC #1, a DL CC #2 is linked to a UL CC #2, and a DL CC #3 is linked to a UL CC #3.

A first PDCCH 701 of the DL CC #1 carries a DCI for a PDSCH 702 of the same DL CC #1. A second PDCCH 711 of the DL CC #1 carries a DCI for a PDSCH 712 of the DL CC #2. A third PDCCH 721 of the DL CC #1 carries a DCI for a PUSCH 723 of the unlinked UL CC #3.

For cross-carrier scheduling, the DCI of the PDCCH may include a carrier indicator field (CIF). The CIF indicates a DL CC (or UL CC) which is scheduled through the DCI. For example, the second PDCCH 711 may include a CIF indicating the DL CC #2. The third PDCCH 721 may include a CIF indicating the UL CC #3.

The cross-carrier scheduling may be activated/inactivated for each UE. For example, a BS may report to a UE whether the CIF is included in the DCI. The UE for which the cross-carrier scheduling is activated may receive the DCI including the CIF. The UE may know for which scheduled carrier the PDCCH received from the CIF included in the DCI is used as control information.

To decrease overhead caused by PDCCH monitoring, only M DL CCs (where M<N) may be monitored if even N DL CCs are supported. A carrier for monitoring the PDCCH is called a monitoring carrier, and a set of monitoring carriers is called a monitoring carrier set.

For example, if the DL CC #1 is a monitoring CC and the DL CCs #2 and #3 are non-monitoring carriers, the UE may perform blind decoding of the PDCCH only in the DL CC #1.

In the conventional 3GPP LTE, it is enough to secure an ACK/NACK resource corresponding to a DL CC linked to one UL CC. However, the multiple-carrier system may have to transmit a plurality of ACK/NACK signals for a plurality of DL CCs in one. UL CC. Therefore, there is a need to secure a plurality of ACK/NACK resources for a plurality of ACK/NACK signals.

Hereinafter, a method of securing a plurality of ACK/NACK resources will be described.

Figure 11:
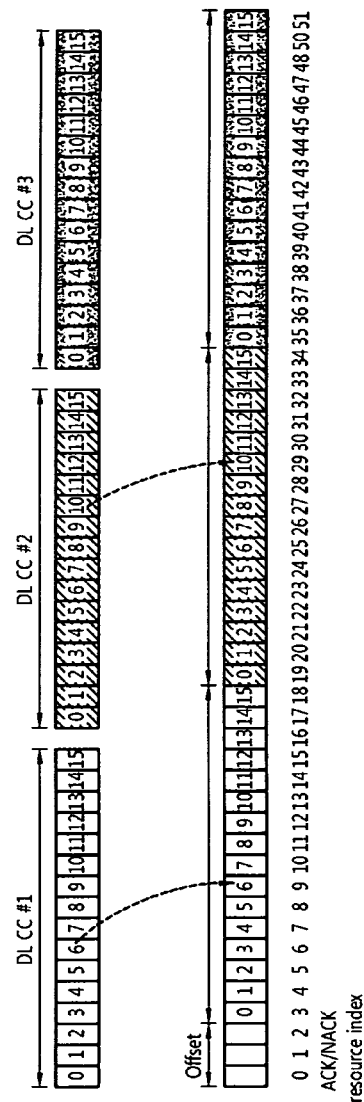
FIG. 11 shows mapping of a CCE and an ACK/NACK resource according to an embodiment of the present invention.

FIG. 11 shows mapping of a CCE and an ACK/NACK resource according to an embodiment of the present invention.

CCE indices of each DL CC are sequentially mapped to ACK/NACK resource indices, after a specific offset value (e.g., $N^{(1)}_{PUCCH}$). Although 3 DL CCs are considered herein, the number of DL CCs and the number of CCEs included in each DL CC are for exemplary purposes only.

DL CCs #1, #2, and #3 include CCEs having CCE indices from 0 to 15, respectively. If an offset is 3, CCE indices 0 to 15 in the DL CC #1 are mapped to ACK/NACK resource indices 3 to 18. A CCE index 0 of the DL CC #2 is mapped to an ACK/NACK resource index 19 corresponding to a sum of the offset and the number of CCEs included in the DL CC #1.

The offset may be reported by a BS to a UE through higher-layer signaling or may be predetermined.

This method has an advantage in that index mapping is simple, and an ACK/NACK resource index is mapped to each CCE index without duplication.

Figure 12:
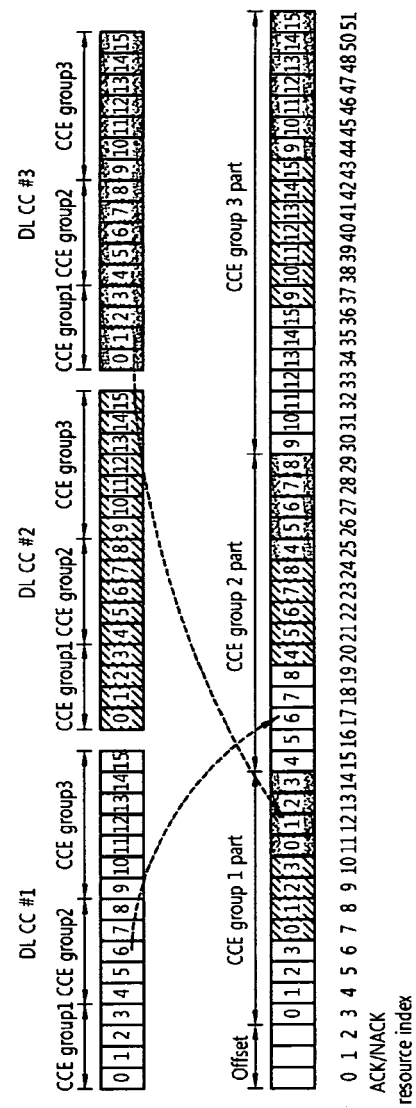
FIG. 12 shows mapping of a CCE and an ACK/NACK resource according to an embodiment of the present invention.

FIG. 12 shows mapping of a CCE and an ACK/NACK resource according to an embodiment of the present invention.

CCE indices in each DL CC are sorted in a descending order, and then are grouped starting from a CCE having a small CCE index. Herein, a CCE group 1 includes a CCE 0 to a CCE 3, a CCE group 2 includes a CCE 4 to a CCE 8, and a CCE group 3 includes a CCE 9 to a CCE 15.

The CCE groups are mapped to ACK/NACK resource indices by grouping the same CCE groups. Grouping of a CCE group 1 of a DL CC #1, a CCE group 1 of a DL CC #2, and a CCE group 1 of a DL CC #3 is called a CCE group 1 part. The CCE indices are sequentially mapped to the ACK/NACK resource indices, starting from an offset. Grouping of a CCE group 2 of the DL CC #1, a CCE group 2 of the DL CC #2, and a CCE group 2 of the DL CC #3 is called a CCE group 2 part. Grouping of a CCE group 3 of the DL CC #1, a CCE group 3 of the DL CC #2, and a CCE group 3 of the DL CC #3 is called a CCE group 3 part.

Therefore, a CCE index 6 of the DL CC #1 corresponds to an ACK/NACK resource index 17, and a CCE index 1 of the DL CC #3 corresponds to an ACK/NACK resource index 12.

In this manner, low CCE indices of the DL CCs are mapped to low ACK/NACK resource indices. Therefore, if all DL CCs or some DL CCs do not use 3 OFDM symbols in a control region in a certain subframe, resources secured for ACK/NACK resources may be used for PUCCH resource with another format, thereby increasing resource utilization.

Figure 13:
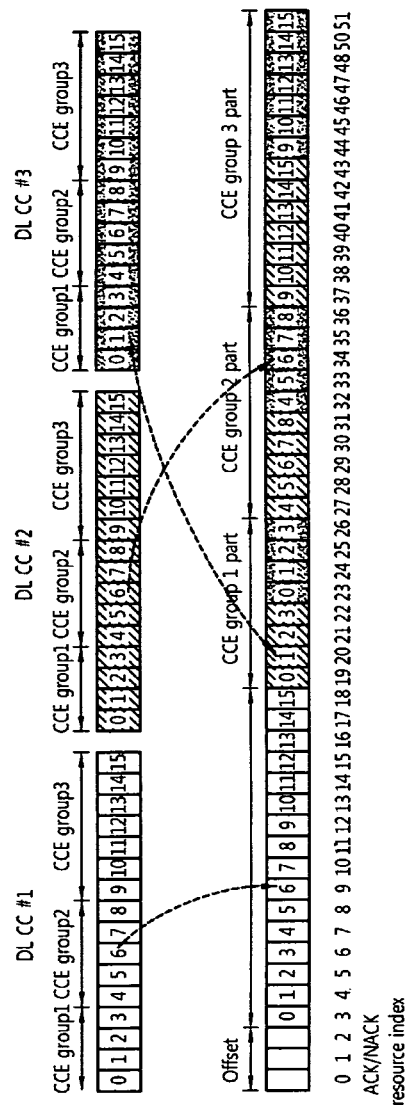
FIG. 13 shows mapping of a CCE and an ACK/NACK resource according to an embodiment of the present invention.

FIG. 13 shows mapping of a CCE and an ACK/NACK resource according to an embodiment of the present invention.

A DL CC #1 uses the mapping method of FIG. 11, and DL CCs #2 and #3 use the mapping method of FIG. 12.

The DL CC #1 may provide backward compatibility with the 3GPP LTE, and the DL CCs #2 and #3 may improve resource utilization.

Figure 14:
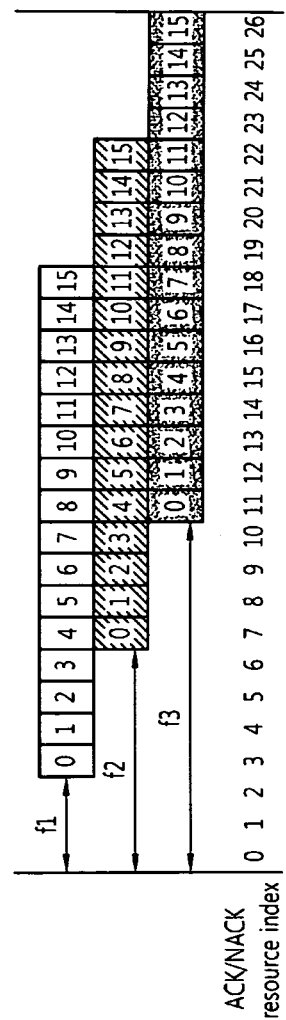
FIG. 14 shows mapping of a CCE and an ACK/NACK resource according to an embodiment of the present invention.

FIG. 14 shows mapping of a CCE and an ACK/NACK resource according to an embodiment of the present invention.

Each DL CC uses a different offset. A DL CC #1 uses a first offset f1, a DL CC #2 uses a second offset f2, and a DL CC #3 uses a third offset f3.

Although it is shown herein that the offset has an absolute value, the offset may be a relative value. For example, the second offset f2 is determined on the basis of the first offset f1.

The offset of each DL CC may be predetermined, or may be reported by a BS to a UE by using higher-layer signaling. The BS reports an offset (e.g., f1) for one DL CC to the UE, and the UE may determine offsets for the remaining DL CCs from one offset.

Figure 15:
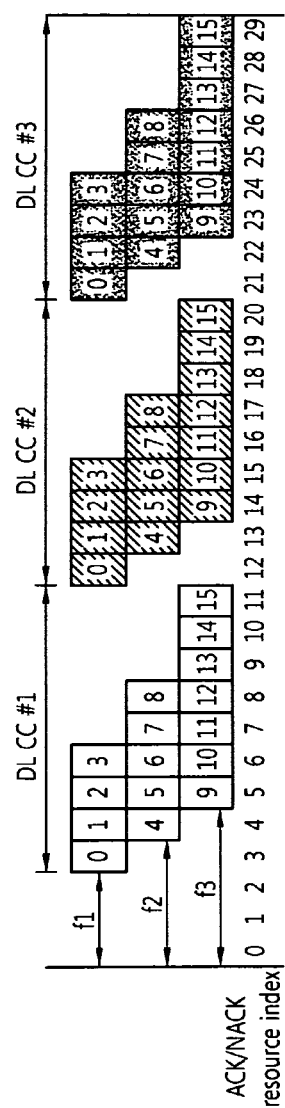
FIG. 15 shows mapping of a CCE and an ACK/NACK resource according to an embodiment of the present invention.

FIG. 15 shows mapping of a CCE and an ACK/NACK resource according to an embodiment of the present invention. In comparison with the embodiment of FIG. 14, CCE indices in a DL CC are divided into CCE groups, and a different offset is used for each CCE group.

A CCE group 1 includes a CCE 0 to a CCE 3. A CCE group 2 includes a CCE 4 to a CCE 8. A CCE group 3 includes a CCE 9 to a CCE 15.

The CCE group 1 uses a first offset f1. The CCE group 2 uses a second offset f2. A CCE group 3 uses a third offset f3.

Although it is shown herein that the offset has an absolute value, the offset may be a relative value. For example, the second offset f2 is determined on the basis of the first offset f1.

The offset of each CCE group may be predetermined, or may be reported by a BS to a UE by using higher-layer signaling. The BS reports an offset (e.g., f1) for one CCE group to the UE, and the UE may determine offsets for the remaining CCE groups from one offset.

Figure 16:
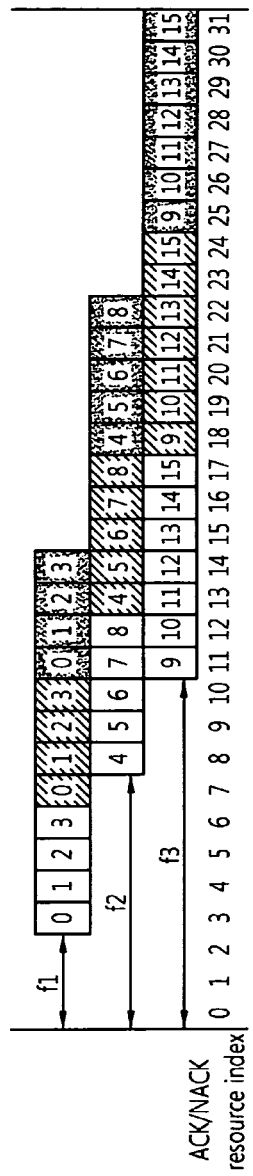
FIG. 16 shows mapping of a CCE and an ACK/NACK resource according to an embodiment of the present invention.

FIG. 16 shows mapping of a CCE and an ACK/NACK resource according to an embodiment of the present invention. Similarly to the embodiment of FIG. 12, CCE indices in a DL CC are divided into CCE groups, and the CCE groups are mapped to ACK/NACK resource indices by grouping the same CCE groups. Grouping of a CCE group 1 of a DL CC #1, a CCE group 1 of a DL CC #2, and a CCE group 1 of a DL CC #3 is called a CCE group 1 part. The CCE indices are sequentially mapped to the ACK/NACK resource indices, starting from an offset. Grouping of a CCE group 2 of the DL CC #1, a CCE group 2 of the DL CC #2, and a CCE group 2 of the DL CC #3 is called a CCE group 2 part. Grouping of a CCE group 3 of the DL CC #1, a CCE group 3 of the DL CC #2, and a CCE group 3 of the DL CC #3 is called a CCE group 3 part.

Each CCE group part uses a different offset. The CCE group 1 part uses a first offset f1. The CCE group 2 part uses a second offset f2. A CCE group 3 part uses a third offset f3.

Although it is shown herein that the offset has an absolute value, the offset may be a relative value. For example, the second offset f2 is determined on the basis of the first offset f1.

The offset of each CCE group part may be predetermined, or may be reported by a BS to a UE by using higher-layer signaling. The BS reports an offset (e.g., f1) for one CCE group part to the UE, and the UE may determine offsets for the remaining CCE group parts from one offset.

Figure 17:
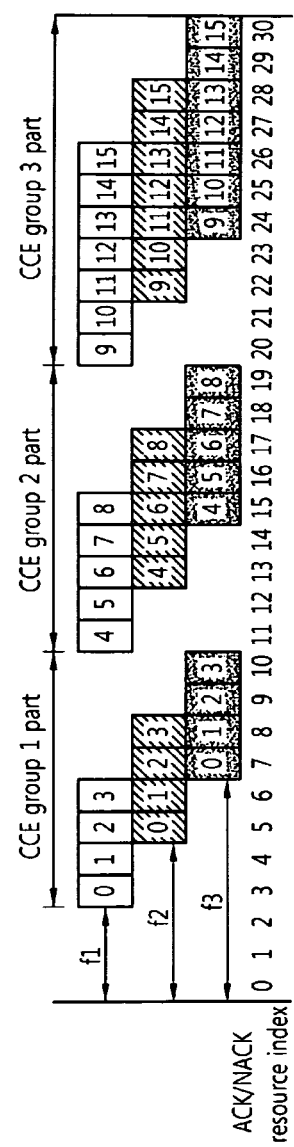
FIG. 17 shows mapping of a CCE and an ACK/NACK resource according to an embodiment of the present invention.

FIG. 17 shows mapping of a CCE and an ACK/NACK resource according to an embodiment of the present invention. In comparison with the embodiment of FIG. 16, each CCE group in a CCE group part uses a different offset.

A CCE group 1 uses a first offset f1. A CCE group 2 uses a second offset f2. A CCE group 3 uses a third offset f3.

Although it is shown herein that the offset has an absolute value, the offset may be a relative value. For example, the second offset f2 is determined on the basis of the first offset f1.

The offset of each CCE group may be predetermined, or may be reported by a BS to a UE by using higher-layer signaling. The BS reports an offset (e.g., f1) for one CCE group to the UE, and the UE may determine offsets for the remaining CCE groups from one offset.

Figure 18:
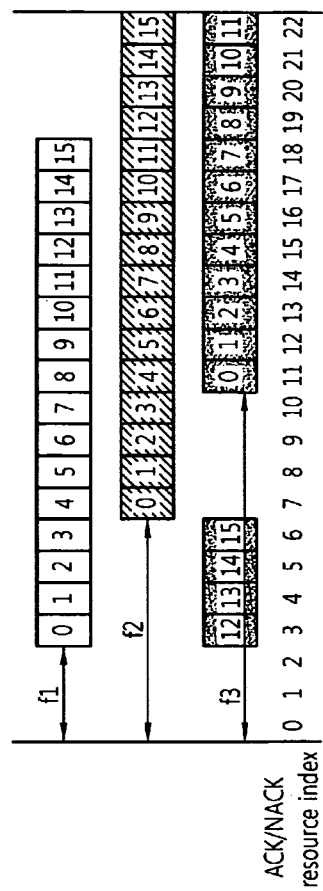
FIG. 18 shows mapping of a CCE and an ACK/NACK resource according to an embodiment of the present invention.

FIG. 18 shows mapping of a CCE and an ACK/NACK resource according to an embodiment of the present invention. In comparison with the embodiment of FIG. 14, a CCE index of a certain DL CC is cyclically mapped to an ACK/NACK resource index.

Assume that the number of available ACK/NACK resource indices is predetermined. Herein, a maximum ACK/NACK resource index is 22.

CCE indices of each DL CC are sequentially mapped to ACK/NACK resource indices on the basis of an offset. A DL CC #1 uses a first offset f1, a DL CC #2 uses a second offset f2, and a DL CC #3 uses a third offset f3.

Since a CCE index 11 of the DL CC #3 is mapped to the maximum ACK/NACK resource index 22, a CCE index 12 of the DL CC #3 is cyclically mapped to an ACK/NACK resource index 3. Although a first ACK/NACK resource index cyclically mapped is based on the first offset f1, it may also be based on an ACK/NACK resource index 0, the second offset f2, or the third offset f3.

Cyclic mapping may also apply to the mapping for each CCE group shown in the embodiment of FIG. 15, the mapping for each CCE group part in the embodiment of FIG. 16 and the mapping for each CCE group in the CCE group part shown in the embodiment of FIG. 17.

Figure 19:
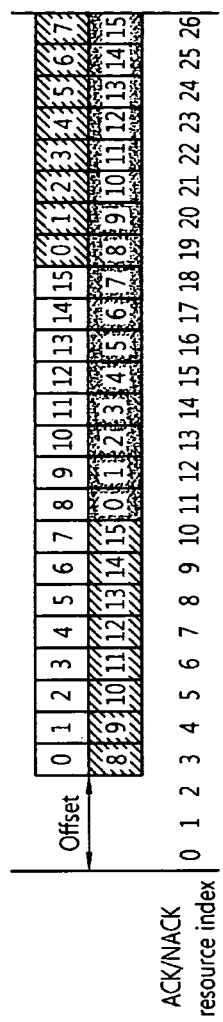
FIG. 19 shows mapping of a CCE and an ACK/NACK resource according to an embodiment of the present invention.

FIG. 19 shows mapping of a CCE and an ACK/NACK resource according to an embodiment of the present invention. Herein, CCE indices are sequentially mapped in a duration of available ACK/NACK resource indices.

Assume that an offset is 3, and a maximum ACK/NACK resource index is 26. CCE indices 0 to 15 of a DL CC #1 are sequentially mapped to ACK/NACK resource indices 3 to 18. Further, CCE indices of a DL CC #2 are mapped to ACK/NACK resource indices. A CCE index 7 of the DL CC #2 is mapped to the ACK/NACK resource index 26, and thereafter a CCE index 8 of the DL CC #2 is cyclically mapped to an ACK/NACK resource index 3. In this manner, CCE indices of the DL CCs #1, #2, and #3 are sequentially mapped to the ACK/NACK resource indices.

Although the CCE indices of the DL CC are mapped to the ACK/NACK resource indices in an ascending order, the CCE indices of the DL CC may be mapped to the ACK/NACK resource indices in a descending order.

Figure 20:
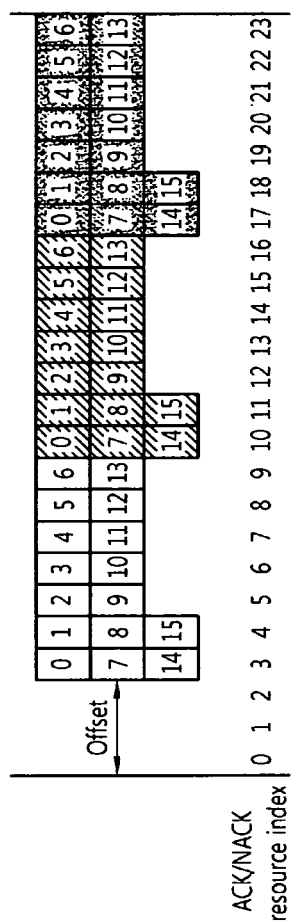
FIG. 20 shows mapping of a CCE and an ACK/NACK resource according to an embodiment of the present invention.

FIG. 20 shows mapping of a CCE and an ACK/NACK resource according to an embodiment of the present invention. Herein, CCE indices are sequentially mapped to ACK/NACK resource indices for each DL CC.

Assume that an offset is 3, and a maximum ACK/NACK resource index is 23. A duration of all available ACK/NACK resource indices is divided by the number of DL CCs to determine a duration of ACK/NACK resource indices for each DL CC.

It is shown herein that CCE indices of a DL CC #1 are cyclically mapped between ACK/NACK resource indices 3 to 9, CCE indices of a DL CC #2 are cyclically mapped between ACK/NACK resource indices 10 to 16, and CCE indices of a DL CC #3 are cyclically mapped between ACK/NACK resource indices 17 to 23.

Figure 21:
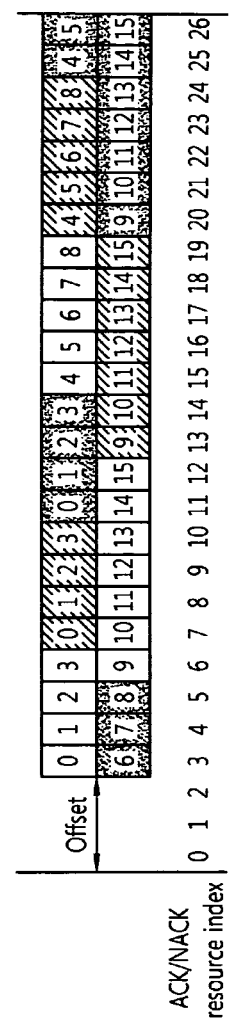
FIG. 21 shows mapping of a CCE and an ACK/NACK resource according to an embodiment of the present invention.

FIG. 21 shows mapping of a CCE and an ACK/NACK resource according to an embodiment of the present invention. Herein, CCE indices are sequentially mapped to ACK/NACK resource indices for each CCE group part.

Figure 22:
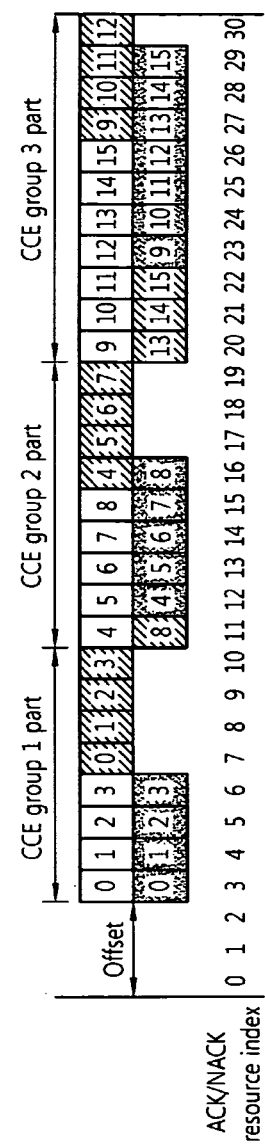
FIG. 22 shows mapping of a CCE and an ACK/NACK resource according to an embodiment of the present invention.

FIG. 22 shows mapping of a CCE and an ACK/NACK resource according to an embodiment of the present invention. Herein, CCE indices in a CCE group part are sequentially mapped to ACK/NACK resource indices for each DL CC.

As described above, a CCE index and an ACK/NACK resource index may be mapped in a one-to-one manner, and a plurality of CCE indices may overlap with one ACK/NACK resource index.

When the CCE indices overlap, they may be mapped to ACK/NACK resource indices by considering a CCE having a lowest probability of being used as a first CCE of a PDCCH (such a CCE is referred to as a reference CCE). An ACK/NACK resource index mapped to an index of a CCE having a low probability of being used as the reference CCE has a low possibility of being an ACK/NACK resource used in actual transmission. Therefore, the CCE having the low probability of being used as the reference CCE may preferably overlap.

For one example, the CCE having a low probability of being used as the first CCE of the PDCCH and a CCE having a high probability of being used as the first CCE of the PDCCH may overlap with the same ACK/NACK resource index. For another example, CCEs having a low probability of being used as the first CCE of the PDCCH may overlap with the same ACK/NACK resource index.

The CCE having a low probability of being used as the reference CCE is as follows.

First, the CCEs having a low probability of being used as the reference CCE are CCEs having odd indices (herein, it is assumed that the CCE index starts from 0). A start point of the PDCCH is determined in a multiple of an aggregation level in the entire CCE stream. That is, if the aggregation level is 2, 4, and 8, only CCE indices which are a multiple of 2, 4, and 8, respectively, are used as the reference CCE. According to such a characteristic, the CCEs having a low probability of being used as the reference CCE are the CCEs having the odd indices.

Second, the CCEs having a low probability of being used as the reference CCE are CCEs included in a common search space. The CCEs included in the common search space may be used to transmit DL data and may also be used to transmit common control information. Since there is no ACK/NACK response when transmitting the common control information, an ACK/NACK resource linked to a corresponding CCE is not used.

Third, the CCEs having a low probability of being used as the reference CCE are CCEs included in a CCE group having a great CCE group index. If the number of OFDM symbols used for PDCCH transmission in a BS at a specific time is less than a maximum value (e.g., 3 OFDM symbols), the greater the CCE group index, the higher the probability of not using a CCE index in a group. CCEs having a high probability may be considered as the opposite case of CCEs having a low probability.

The aforementioned embodiments of FIG. 12 to FIG. 22 may be combined. Only ACK/NACK resources for a specific DL CC may be indexed without overlapping, and ACK/NACK resources of the remaining DL CCs may be mapped with overlapping.

Figure 23:
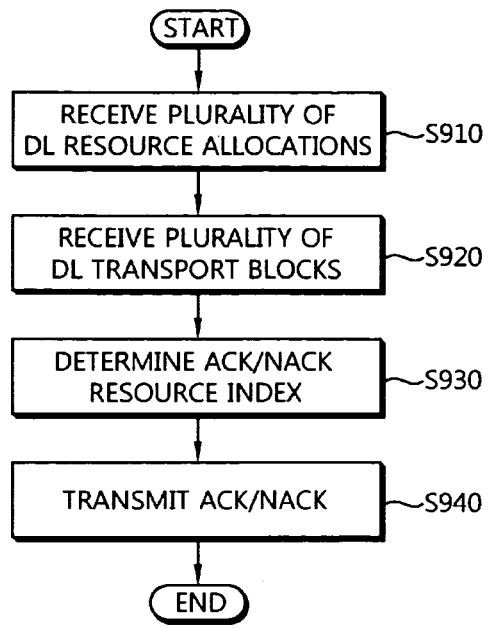
FIG. 23 is a flowchart showing a method of transmitting reception acknowledgment according to an embodiment of the present invention.

FIG. 23 is a flowchart showing a method of transmitting reception acknowledgment according to an embodiment of the present invention. This method may be performed by a UE.

The UE receives a plurality of DL resource allocations on a plurality of PDCCHs by using a plurality of DL CCs (step S910).

The UE receives a plurality of DL transport blocks on a plurality of PDSCHs indicated by the plurality of DL resource allocations from a BS (step S920).

The UE determines a plurality of ACK/NACK resource indices on the basis of a plurality of CCE indices obtained from DL resources which use the plurality of PDCCHs (step S930). The ACK/NACK resource indices mapped to the CCE indices may be determined on the basis of the aforementioned embodiments of FIG. 12 to FIG. 22 or combinations thereof.

The UE transmits ACK/NACK for the plurality of DL transfer blocks by using ACK/NACK resources indicated by the plurality of ACK/NACK resource indices (step S940).

Figure 24:
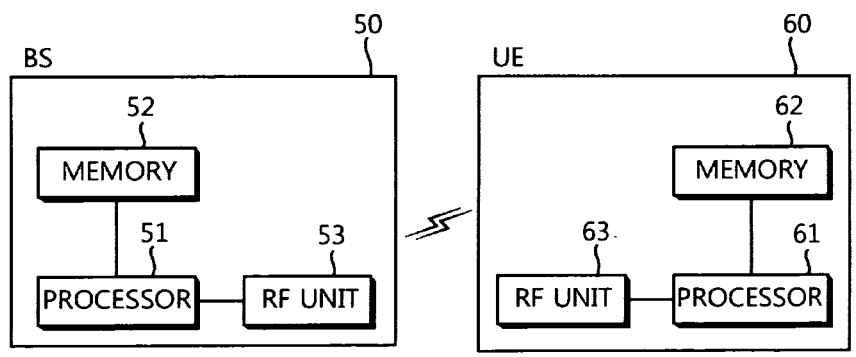
FIG. 24 is a block diagram showing a wireless communication system for implementing an embodiment of the present invention.

FIG. 24 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 supports HARQ, and implements the proposed functions, processes and/or methods. The processor 51 may perform CCE index-ACK/NACK resource index mapping on the basis of the embodiments of FIG. 12 to FIG. 22 or combinations thereof, and may transmit a PDCCH on the basis of the mapped CCE index.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 supports HARQ, and implements the proposed functions, processes and/or methods. The processor 61 may implement the method of transmitting the reception acknowledgement, and may determine an ACK/NACK resource index mapped to a CCE index on the basis of the embodiments of FIG. 12 to FIG. 22 or combinations thereof.

The processor may includes application-specific integrated circuit (ASIC), other chipset, logical circuit and/or data processing devices. Memory may includes read-only memory (ROM), random access memory (RAM), flash memory, memory card, storage medium and/or other storage devices. RF unit may includes a baseband circuit for processing radio signal. While the embodiments are implemented by a software, above methods may be implemented by a module (step, function etc. . . . ) which practice an above function. A module may be stored in a memory, and implemented by a processor. Memory may be inside of a processor or outside of a processor, and connected to a processor by a variety of well known ways.

In the above examples, some methods have been described as a series of the steps or blocks on the basis of the flowcharts. It is, however, to be noted that the present invention is not limited to the sequences of the steps, and a certain step can be performed according to a different step and a different sequence or according to the same step and the same sequence, described above. Furthermore, those skilled in the art will appreciate that the steps illustrated in the flowcharts are not exclusive and other steps can be included in the flowcharts or one or more of the steps can be deleted without departing from the scope of the present invention.

The invention claimed is:

1. A method of transmitting acknowledgment (ACK)/negative acknowledgment (NACK) for hybrid automatic repeat request (HARQ) in a wireless communication system, the method comprising:

receiving, by a user equipment (UE), a plurality of downlink resource allocations on a plurality of physical downlink control channels (PDCCHs) of a plurality of downlink carriers;

receiving, by the UE, a plurality of downlink transfer blocks on a plurality of physical downlink shared channels (PDSCHs) indicated by the plurality of downlink resource allocations via the plurality of downlink carriers;

determining, by the UE, resources of a physical uplink control channel (PUCCH) for transmitting ACK/NACK, based on higher layer signaled values and at least one of indices of a plurality of control channel elements (CCEs) in which the plurality of PDCCHs are used, wherein the higher layer signaled values are defined as downlink carriers specifically different from each other; and transmitting, by the UE, a plurality of ACKs/NACKs for the plurality of downlink transfer blocks on the determined resources of the PUCCH, wherein the determining of the resources of the PUCCH by the UE includes determining indices of the resources of the PUCCH, and wherein a same index for the resources of the PUCCH is determined from at least two of the indices of the plurality of CCEs.

2. The method of claim 1, wherein the resources of the PUCCH are determined respectively from the indices of the plurality of CCEs.

3. The method of claim 1, wherein the higher layer signaled values are defined for each CCE group in the plurality of downlink carriers.

4. The method of claim 1, wherein the higher layer signaled values are defined for each CCE group part which includes at least one CCE group selected from each of the plurality of downlink carriers.

5. The method of claim 1, wherein the higher layer signaled values are received from a base station.

6. The method of claim 4, wherein the CCE group part comprises CCE groups including a same CCE index from the plurality of downlink carriers.

7. The method of claim 6, wherein, among the plurality of CCE group parts, a CCE group part including a low CCE index is mapped to a low ACK/NACK resource index.

8. A user equipment for transmitting acknowledgment (ACK)/negative acknowledgment (NACK) for hybrid automatic repeat request (HARQ) in a wireless communication system, the user equipment comprising:

a radio frequency (RF) unit configured to transmit and receive a radio signal; and a processor coupled to the RF unit, wherein the processor is configured to:

receive a plurality of downlink resource allocations on a plurality of physical downlink control channels (PDCCHs) of a plurality of downlink carriers;

receive a plurality of downlink transfer blocks on a plurality of physical downlink shared channels (PDSCHs) indicated by the plurality of downlink resource allocations via the plurality of downlink carriers;

determine resources of a physical uplink control channel (PUCCH) for transmitting ACK/NACK, based on higher layer signaled values and at least one of indices of a plurality of control channel elements (CCEs) in which the plurality of PDCCHs are used, wherein the higher layer signaled values are defined as downlink carriers specifically different from each other; and transmit a plurality of ACKs/NACKs for the plurality of downlink transfer blocks on the determined resources of the PUCCH, wherein the processor determines the resources of the PUCCH by determining indices of the resources of the PUCCH, and wherein a same index for the resources of the PUCCH is determined from at least two of the indices of the plurality of CCEs.

9. The user equipment of claim 8, wherein the resources of the PUCCH are determined respectively from the indices of the plurality of CCEs.

* * * * *